Sept. 29, 1953    W. R. MOORE, JR    2,653,580
FLUID CONTROL SYSTEM AND VALVE
Filed Dec. 31, 1947

INVENTOR
*W. R. MOORE, JR.*

BY *A. Yates Dowell.*
ATTORNEY

Patented Sept. 29, 1953

2,653,580

UNITED STATES PATENT OFFICE 2,653,580

FLUID CONTROL SYSTEM AND VALVE

William R. Moore, Jr., Hagerstown, Md.; William R. Moore III, administrator of said William R. Moore, Jr., deceased Application December 31, 1947, Serial No. 795,085

4 Claims. (Cl. 121—46.5)

This relates to energy or force transmission and to a system containing motive fluid utilized in the transmission of such energy or force. The invention additionally is specifically directed to the control of the movement of the motive fluid in the system.

It is an object of the invention to provide a simple, inexpensive, efficient, fluid control system, of few parts of standard design, which can be readily assembled with minimum effort, and which will give maximum service.

The system of the present invention comprises a source of liquid or gaseous fluid under pressure, a piston and mechanism for controlling the reciprocation of the piston in two directions at varying speeds to suit requirements. The piston may be utilized to operate churns, vises, or other clamping mechanisms, machine carriages, such as surface grinders, tool posts and turret head lifts, jacks, presses, loading and unloading mechanisms, and various other structures requiring power for their actuation.

Figure 1:
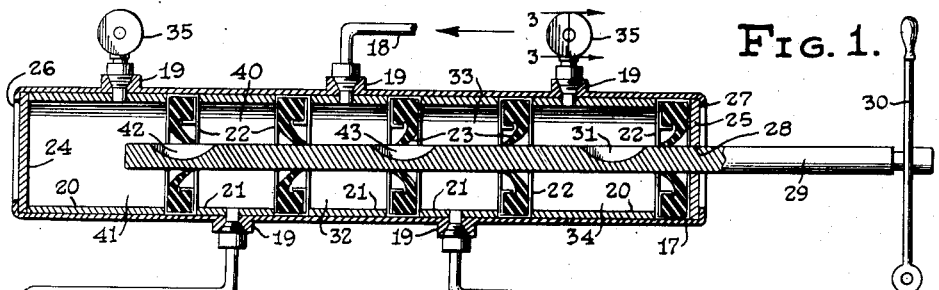
Figure 2:
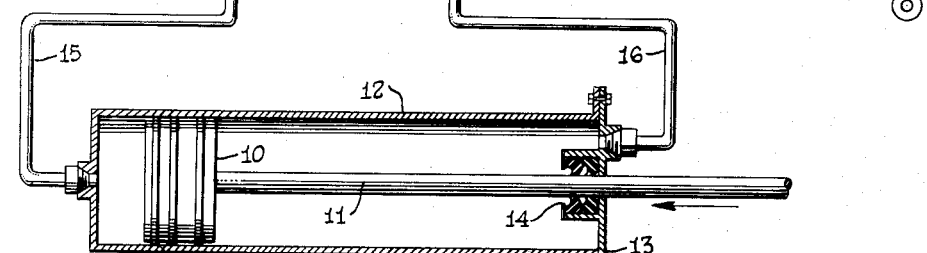
Figure 2:
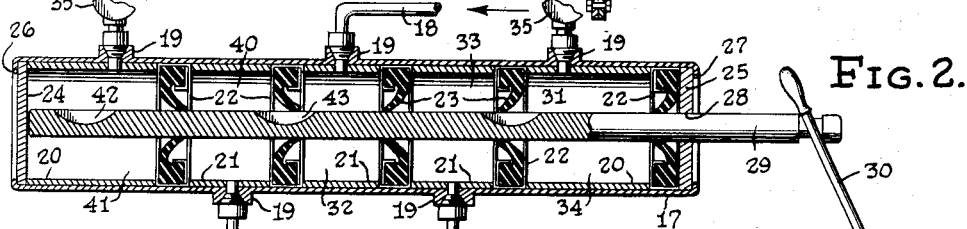

Further objects and advantages of the invention will be apparent from the following description taken in conjunction with the accompanying drawings, wherein:

Fig. 1 is a section illustrating one application of the invention;

Fig. 2, a similar view with the parts in the opposite position; and

Figure 3:
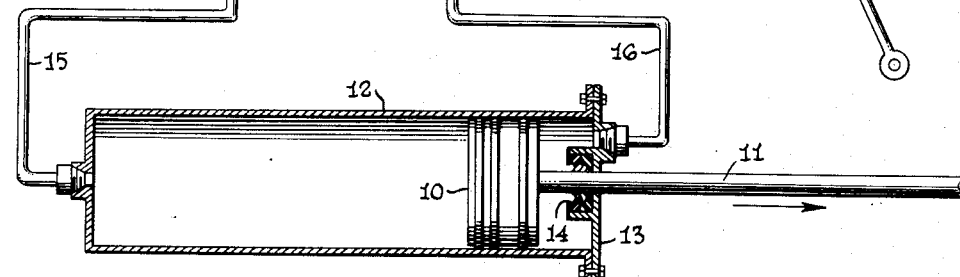
Figure 3:
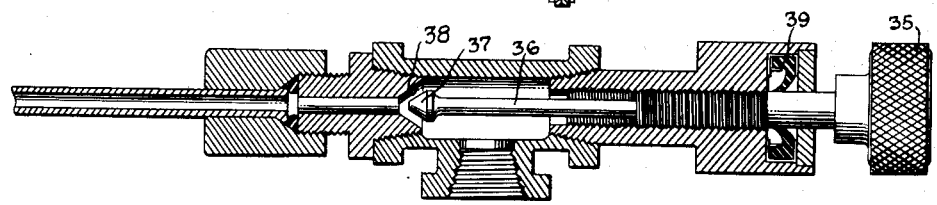

Fig. 3, a detailed section at right angles to that of Figs. 1 and 2 on the line 3—3 of Fig. 1.

With continued reference to the drawings the system, in addition to a source of supply not shown for fluid under pressure, comprises a piston 10 for applying force through a rod or connection 11 to mechanism, also not shown, to be operated. The piston 10 is housed in a cylinder 12 having a head 13 through which the rod 11 reciprocates and with a conventional fluid seal and gasket 14 preventing leakage around the rod 11.

Fluid lines 15 and 16 connect the interior of the cylinder 12 on opposite sides of the piston 10 with a valve chamber or housing 17. The main valve body is adapted to receive fluid under pressure from a source of supply not shown through an inlet tube 18. In order to form connections between the lines 15 and 16 and the inlet 18 the housing 17 is provided with a series of openings about which sleeves 19 are brazed.

A plurality of spacer sleeves 20 and 21 are employed for holding partition members 22 in fixed position in the housing 17, each partition member 22 being provided with sealing members 23, which are nothing more than gaskets of conventional type. In lieu of the material of which member 23 is formed any plastic, rubber or pliable seal that will hold pressure from one side may be employed. These are now manufactured and sold in all sizes as oil retaining rings for bearings.

The flexible lips of the sealing members fit around the rod 29 in a manner such that pressure exerted causes sealing and the higher the pressure, the tighter the seal. This pressure seal prevents the passage of fluid in one direction and permits passage in the opposite direction, attention being directed to the fact that the seals are turned so that they all permit the flow of fluid toward the inlet 18. If desired, instead of each of the seals used one or more seals may be employed. The seals employed, however, are particularly adapted for the purpose for which they are employed.

End plates 24 and 25 are utilized for closing the ends of the housing, being held in position by the inward rolling of the ends of the housing to form inturned flanges 26 and 27.

The end member 24 is a solid disc while the end member 25 is provided with a central opening 28 to accommodate a valve member or rod 29 adapted to be reciprocated in any desired manner, as for example by a bifurcated lever 30, which permits the rod to rotate. The rod 29 extends through each of the partitions 22 and is engaged by the sealing members 23. It also is provided with spaced slots 31, 42 and 43 which may be produced by a conventional milling cutter and when these slots are by movement of the rod brought into the same general position as the partitions 22 they form communication with opposite sides of the partitions. The partitions define five chambers namely the central inlet chamber 32, a pair of intermediate chambers 33 and 40, and a pair of end chambers 41 and 34.

When the valve member 29 is in position shown in Fig. 1 fluid admitted through the tube 18 into the chamber 32 will flow through the slot 43 into the chamber 33 and thence through the pipe 16 into the cylinder 12 where it may exert pressure against the piston 10 to move it to the left, as shown in Fig. 1, whereupon fluid entrapped on the opposite side of the piston 10 in the cylinder 12 may flow through the tube 15 into the chamber 40 and through the slot 42 into the chamber 41 from which it may escape or pass to a reservoir. With the construction shown of the round shaft with ports 31, 42 and 43 milled in the same, the reciprocating movement of the shaft will not cause injury to or collapse of the seal and will not catch against the sealing lip. Also for satisfactory operation the size of the shaft and the area of the slots must be the same as that of the incoming supply line. If the line is 1/8" pipe, a corresponding size opening must be cut in the shaft requiring a 3/8" shaft in order to be sufficiently large to accommodate the proper size slots. If a larger supply line is needed, a correspondingly larger shaft, seals, and housing will be required in order to eliminate air on the seal at any spot where the pressure tends to force the seal into the slot as the slot is caused to move transversely of the seal. Actual tests have proven that with 125 lbs. of air pressure, 54,000 reciprocations of the rod so that the slot passed the seal produced no appreciable leakage.

The volume of the fluid discharged from the chambers 34 and 41 is controlled by the manipulation of a knurled knob 35 attached to a valve stem 36 for causing the seating or unseating of a valve 37. Movement of the valve 37 toward its seat 38 can be varied or controlled to suit requirements. Thus the needle valves in the exhaust ports of the main valve have a definite part to play in the operation of the device, also the needle valve is constructed of inexpensive standard parts, including an oil seal 39, a standard pipe T, a standard compression seat, a cup, a valve stem, etc.

In the production of the device the partition members and the spacers are pressed into the tube or housing 17, after which the end plates 24 and 25 are secured in place by flanging over the ends of the housing as described above.

In the operation of the device, fluid through the line 18 will enter the chamber 22 and, with the rod 29 in the position shown, this fluid will travel through the orifice 43 into the chamber 33 and through the line 16 into the cylinder. At the same time fluid on the opposite side of the piston 10 will travel through the pipe 15 into the chamber 40, through the narrow groove or orifice 42 into the chamber 41 and be discharged through the valve line controlled by the knurled knob 35.

Speed of movement of the piston is controlled by the needle valve 37 in accordance with its position. If this valve is closed the fluid on the discharge side of the piston will be compressed until a pressure is attained equivalent to the incoming pressure or the pressure on the inlet side of the piston so that the piston will not move. Opening the valve 37 slightly will allow the piston to move slowly, while increasing the amount of the opening will increase the speed of movement.

In like manner, when the rod 29 is moved mechanically or otherwise to the opposite end of its travel, the pressure medium will be ported to the left side of the piston and the return motion of the piston and shaft will be controlled by the needle valve in the outlet line of chamber 34.

Thus a regulated quick return of the main piston may be attained and a slow even regulated forward motion. Reciprocation may be obtained by operating valve lever 30 by hand, by a solenoid valve through an electrical contact, or by adjusted knobs on a reciprocating mechanism.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A fluid control member comprising a housing, partition members in said housing including non-metallic portions extending inwardly a substantial distance beyond any adjacent metal portion defining a central chamber two intermediate chambers and a pair of end chambers, an inlet for admitting operating fluid into said central chamber, outlets for the discharge of operating fluid from the end chambers, a control member reciprocable in said partitions in contact only with said non-metallic portions and having recesses extending inwardly from the surface of and spaced along said control member for permitting flow from one side of the partitions to the other to control movement of fluid in said housing and sleeves maintaining said partitions in spaced relation.

2. A fluid control member comprising a housing, partition members in said housing including non-metallic portions extending inwardly a substantial distance beyond any adjacent metal portion defining a central chamber two intermediate chambers and a pair of end chambers, an inlet for admitting operating fluid into said central chamber, outlets for the discharge of operating fluid from the end chambers, a control member reciprocable in said partitions in contact with said non-metallic portions and having recesses for permitting flow from one side of the partitions to the other to control movement of fluid in said housing and thin tubular spacing sleeves between and abutting said partitions for maintaining said partitions in fixed position, the ends of said housing being provided with internal flanges retaining the partitions and spacing sleeves in assembled relation.

3. A control valve comprising a tubular body closed at one end and open at the other end, a plurality of non-metallic partitions positioned in said body transversely thereof, a plurality of tubular sleeves positioned between said partitions closely adjacent the inner periphery of said body, one of said partitions closing said open end of said body, an elongated control member extending through said partitions providing a plurality of closed chambers, said control member having a plurality of grooves arranged in spaced relation along said control member, each of said grooves being of sufficient length to provide communication between adjacent chambers to allow fluid to flow between adjacent chambers at certain times and of limited length to be adapted to be positioned between adjacent partitions to prevent the flow of fluid between adjacent chambers at other times, inlets and outlets in communication with said chambers whereby said control valve may be effective to control a supply of fluid.

4. A control valve comprising a tubular body closed at one end and open at the other, at least four flexible non-metallic partitions arranged transversely of and in spaced relation within said body, at least five thin tubular spacing means positioned between said partitions and the ends of the tubular body for maintaining said partitions in spaced relation, a partition closing the open end of said body, a control member extending through all of said partitions, the portion of said partitions contacting the control member being formed to extend toward a point between the center two of said four partitions, said partitions with said control member defining fluidtight chambers, said tubular body being formed with passages in communication with said chambers, said control member being formed with grooves arranged in spaced relation along the surface of said control member and adapted to provide communication between adjacent chambers in one position and said grooves being of a size to be received completely within a chamber to avoid communication between adjacent chambers in another position of said control member, said control member being entirely free from metallic contact at all times with respect to said partitions.

WILLIAM R. MOORE, JR.

References Cited in the file of this patent

UNITED STATES PATENTS

| Number | Name | Date |
|---|---|---|
| 967,565 | Rohan | Aug. 16, 1910 |
| 1,016,167 | McCulloch | Jan. 30, 1912 |
| 1,251,563 | O'Donnell | Jan. 1, 1918 |
| 1,431,101 | Dineen | Oct. 3, 1922 |
| 1,465,540 | Brandriff | Aug. 21, 1923 |
| 2,176,008 | Hoyt | Oct. 10, 1939 |
| 2,190,939 | Ernst | Feb. 20, 1940 |
| 2,598,891 | Cooke | June 3, 1952 |

FOREIGN PATENTS

| Number | Country | Date |
|---|---|---|
| 311,166 | Great Britain | May 9, 1929 |